UNITED STATES PATENT OFFICE.

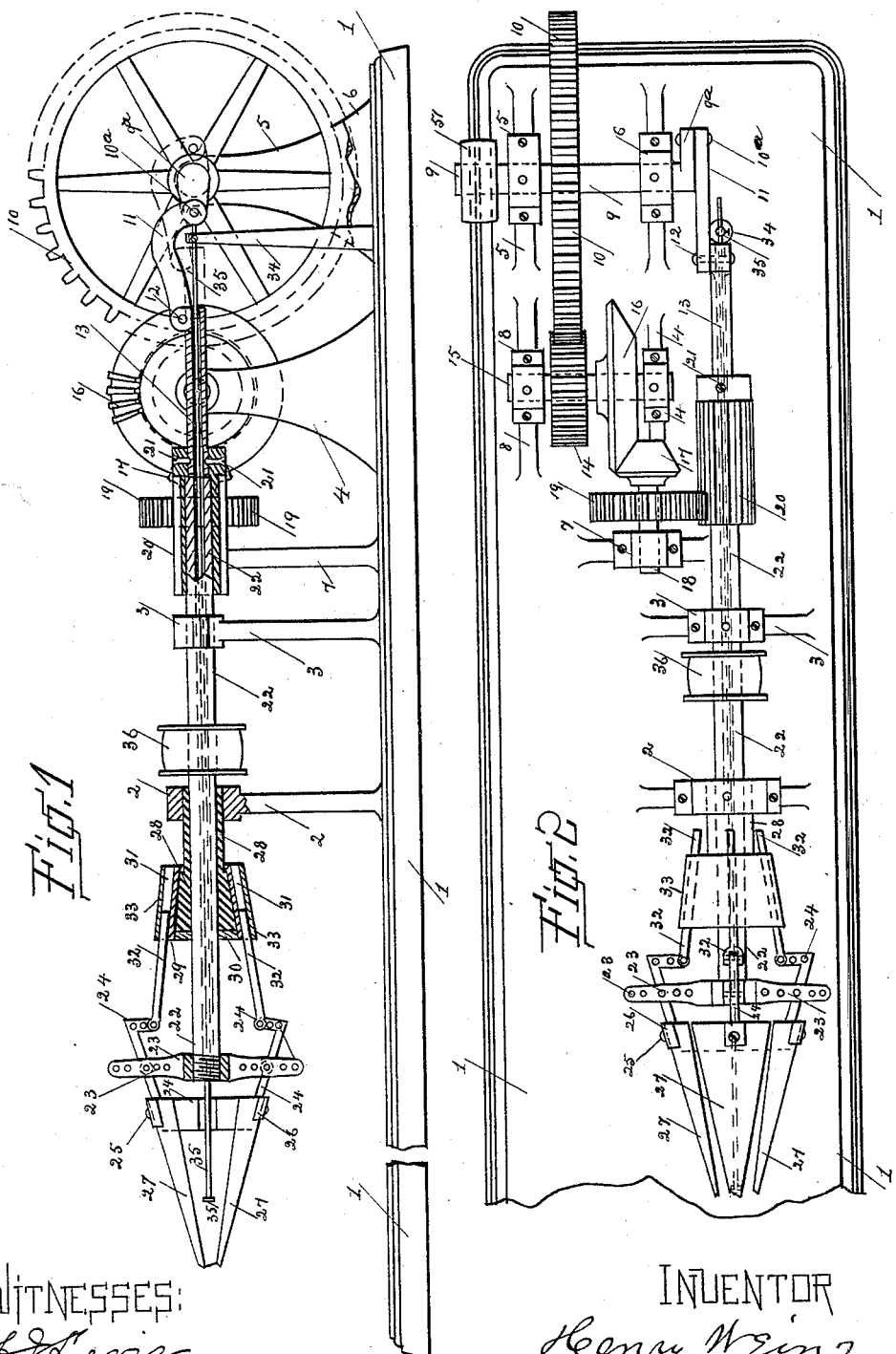

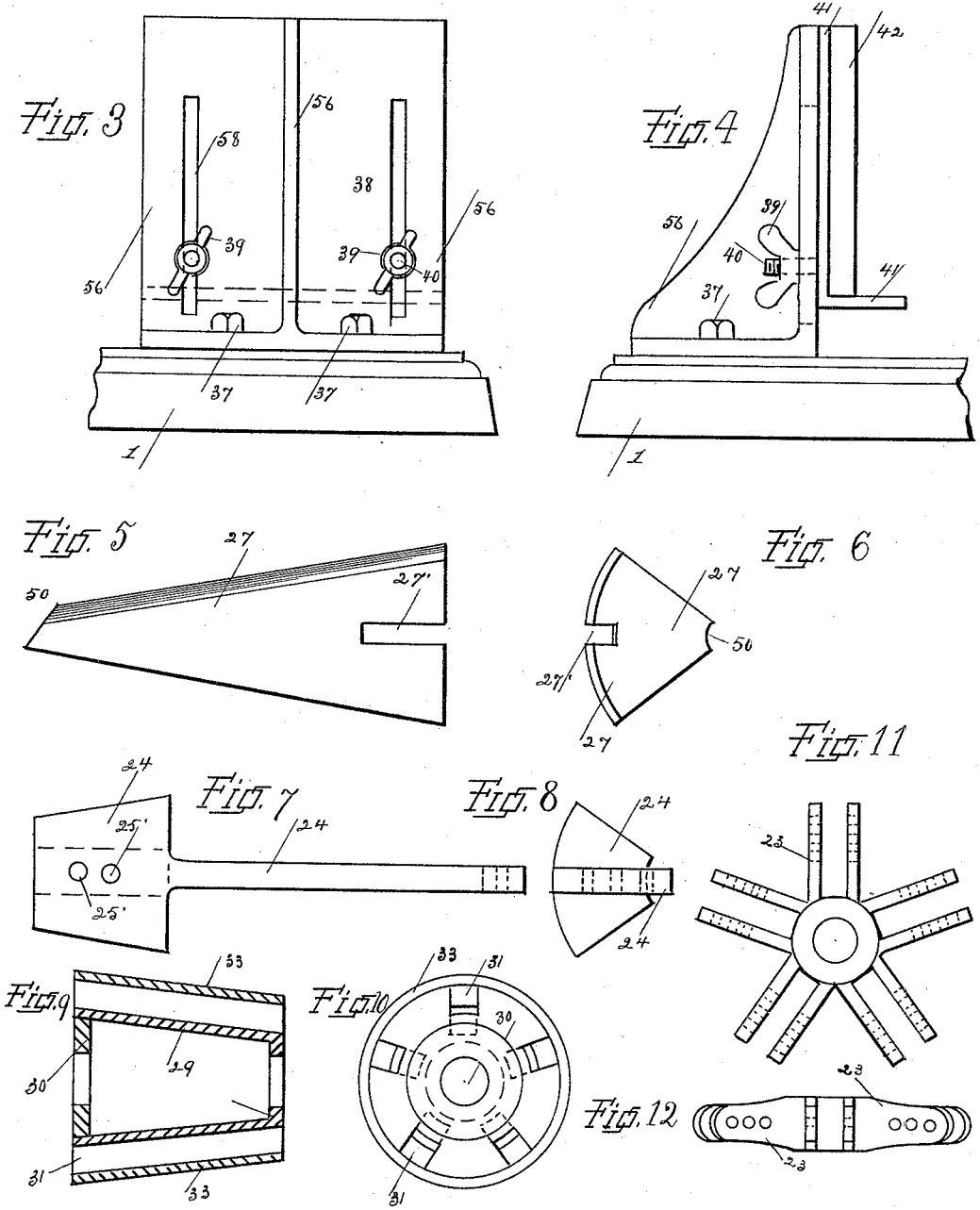

HENRY WEINZ, OF PITTSBURG, PENNSYLVANIA.

CORK-CUTTING MACHINE.

SPECIFICATION forming part of Letters Patent No. 584,298, dated June 8, 1897.

Application filed May 6, 1896. Serial No. 590,422. (No model.)

*To all whom it may concern:*

Be it known that I, HENRY WEINZ, a citizen of the United States, residing at Pittsburg, in the county of Allegheny and State of Pennsylvania, have invented certain new and useful Improvements in the Manufacture of Corks; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in the manufacture of corks; and the object of my invention is to provide a machine that may be operated without employing skilled labor and also make a complete tapered cork at one operation as well as effecting a saving of the cork.

A description of my invention will be fully shown and described in the accompanying drawings and specification, in which—

Figure 1 is a side view of the machine partly shown in section and having one of the cutting-knives removed. Fig. 2 is a plan view of the same with a portion of the bed-plate broken away. Fig. 3 is a back view of the frame for holding the cork during operating. Fig. 4 is a side view of the same. Fig. 5 is a plan view of one of the knives. Fig. 6 is an end view of the same. Fig. 7 is a plan view of the arm to which the knife is secured. Fig. 8 is an end view of the same. Fig. 9 is a sectional view through the slide-block. Fig. 10 is an end view of the same. Fig. 11 is a front view of the spider to which the adjustable knife-arms are centered. Fig. 12 is a plan view of the same.

In constructing the machine I provide a bed-plate 1, having the upright standards 2, 3, 4, 5, 6, 7, and 8, cast or otherwise secured thereto and fitted with bearings and caps.

To the main shaft 9 is secured the gear-wheel 10 and operates with the pinion 14, which is secured to the shaft 15. A bevel-gear 16 is secured to the said shaft and operates with the beveled gear-pinion 17, which is secured to the shaft 18. The gear-wheel 19 is also secured to the said shaft. Upon the end of the main shaft 9 is formed a crank $9^a$ and is connected up to the hollow shaft 13 by the link 11 and pins $10^a$ and 12. The said shaft 13 is loosely secured on the end of the pinion 20 by the screws 21. A groove is formed around the end of the said shaft 13 for the ends of the screws to work in, so that the pinion 20 may be free to revolve without moving the said shaft. A hollow shaft 22 has the pinion 20 secured to one end, and to the opposite end is secured the spider 23. The arms 24 are pivoted to the said spider and are secured fast to the knife-blades 27 by the bolt or screw 25 and washer 26. A tapered hollow bearing 28 is secured fast to the standard 2. Loosely mounted upon the tapered portion of the said bearing is the slide-block 29, which is free to revolve upon the said bearing, and is held in place by a shoulder formed upon the small portion of the said tapered bearing and the washer 30, which is secured fast to the slide-block. The tapered slides 31 are formed within the block and the arms 32 loosely fitted therein and loosely pivoted to the arms 24. The tapered sleeve 33 is fitted over the slide-block and secured thereto. The upright standard 34 has secured to its top the rod 35, which extends through the hollow shafts 13 and 22 and out even with the ends of the knives. A pulley 36 is secured to the shaft 22. The frame 56 (shown at Figs. 3 and 4) is bolted down in front of the knives to the bed-plate 1 by the bolts 37. An angular frame 41 has the plate of cork or gum 42 secured thereto and is provided with the bolts 40, which extend through the slots 38 of the frame, and may be secured and adjusted thereto by the thumb-screws 39.

The knife-blades 27 have a slot 27' formed therein, and may be adjusted back and forth as they wear down, the angular point 50 thereof being sharpened to a keen edge.

The knives may be adjusted for the cutting of various-sized corks by properly adjusting the arms 24 and 32 within the various holes shown at their pivotal points.

In the operation of the machine the power is supplied by a belt to either of the pulleys 36 or 51. The crank $9^a$ on the main shaft on its back stroke forces the knives open, as shown at Fig. 2, by the backward movement of the shaft 22, which revolves with the knives, spider, and slide-block. The said knives are gradually opened and on the full backward stroke the cork is placed on the frame 56 in front of the knives and on the forward stroke the knives gradually advance into the cork and close, cutting a perfectly-tapered cork. Fig. 1 shows the knives when advanced and closed. In the backward stroke the knives again gradually open and the finished cork coming in contact with the end of the rod 35 is forced out. The operation is then repeated, the corks being cut out in rapid succession.

I do not confine myself to the exact shape or number of the knives as shown, as various modifications in the shape and number may be made.

Having thus fully shown and described my invention, what I claim as new, and desire to secure by Letters Patent, is—

1. In a cork-cutting machine, the revoluble series of knife-blades, the revolving spider, the slide-block having the inclined openings, the sliding arms moving in said inclined openings, and the arms carrying said knife-blades and pivoted to said spider and the aforesaid arms, substantially as set forth.

2. In a cork-cutting machine, the revoluble series of knife-blades, the revolving spider, the slide-block having the inclined passages or openings, the sliding arms moving in said inclined passages, the arms carrying said knife-blades and pivoted to said spider and the aforesaid arms, the tubular stationary shaft, the tubular revolving shaft actuated by a pinion loosely connected to said stationary shaft and carrying said spider, the rod acting upon the finished cork and passing through said tubular shafts, and the crank-shaft and link-actuating mechanism for moving at intervals said stationary shaft, substantially as set forth.

3. In a cork-cutting machine, the revoluble series of knife-blades 27 secured to arms 24 pivoted to the revolving spider 23 and sliding arms 32, the said arms 32 adapted to slide within the inclined openings 31 of the slide-block 29, the said arms being capable of adjustment at their pivoted points for opening or closing the knives for the cutting of various-sized corks, substantially as shown and described.

4. In a cork-cutting machine, the crank 9, link 11 and stationary shaft 13 loosely secured to the revolving pinion 20, shaft 22, slide-block 29, spider 23, arms 24, and 32 and knives 27, for the purpose of advancing on their forward stroke the said knives into the cork and closing while cutting the cork in the tapered form, and to open the knives on the backward stroke, substantially as shown and described.

In testimony whereof I affix my signature in presence of two witnesses.

HENRY WEINZ.

Witnesses:
 ARCH HANLON,
 JAS. J. MCAFEE.